(12) United States Patent
Neuman

(10) Patent No.: US 12,103,374 B2
(45) Date of Patent: Oct. 1, 2024

(54) ELECTRIC DRIVE MODULE FOR DRIVING AN AXLE

(71) Applicant: Advanced Design Solution s.r.o., Koprivnice (CZ)

(72) Inventor: Vilém Neuman, Koprivnice (CZ)

(73) Assignee: ADVANCED DESIGN SOLUTION S.R.O., Koprivnice (CZ)

( * ) Notice: Subject to any disclaimer, the term of this patent is extended or adjusted under 35 U.S.C. 154(b) by 0 days.

(21) Appl. No.: 18/257,036

(22) PCT Filed: Feb. 21, 2022

(86) PCT No.: PCT/CZ2022/050019
§ 371 (c)(1),
(2) Date: Jun. 12, 2023

(87) PCT Pub. No.: WO2022/174848
PCT Pub. Date: Aug. 25, 2022

(65) Prior Publication Data
US 2024/0042841 A1    Feb. 8, 2024

(30) Foreign Application Priority Data
Feb. 21, 2021    (CZ) .................................. CZ2021-78

(51) Int. Cl.
*B60K 1/02*    (2006.01)
*B60K 6/405*    (2007.10)
*B60K 6/50*    (2007.10)

(52) U.S. Cl.
CPC ................ *B60K 1/02* (2013.01); *B60K 6/405* (2013.01); *B60K 6/50* (2013.01); *B60Y 2300/18141* (2013.01)

(58) Field of Classification Search
CPC . B60K 1/02; B60K 6/405; B60K 6/50; B60Y 2300/18141
See application file for complete search history.

(56) References Cited

U.S. PATENT DOCUMENTS

| 9,637,127 B1 | 5/2017 | Cooper |
| 2008/0234915 A1* | 9/2008 | Nomasa ................ B60W 10/04 701/102 |

(Continued)

FOREIGN PATENT DOCUMENTS

| CN | 106314136 A | 1/2017 |
| CN | 206749500 U | 12/2017 |

(Continued)

OTHER PUBLICATIONS

European Patent Office, International Search Report dated Jun. 6, 2022, in International Patent Application No. PCT/CZ2022/050019 filed Feb. 21, 2022.

(Continued)

*Primary Examiner* — Edwin A Young
(74) *Attorney, Agent, or Firm* — Thedford I. Hitaffer; Hitaffer & Hitaffer, PLLC

(57) ABSTRACT

An electric drive module comprises a housing, at least one electric motor attached to the housing, a main gear wheel mechanically connected to the electric motor by mechanical gears, a gearbox, where the gearbox input member is driven by the main gear wheel, an axle differential housed in an axle differential housing and driven by an gearbox output, and drive shafts driven by the axle differential, the axis of which is parallel to the axis of the gearbox. At least a portion of the differential housing is rigidly connected to the output member of the gearbox, which allows direct connection of the gearbox and the differential.

16 Claims, 11 Drawing Sheets

(56) References Cited

U.S. PATENT DOCUMENTS

2018/0306294 A1* 10/2018 Wang ............... F16H 48/36
2019/0128393 A1*  5/2019 Heeke .............. F16H 48/08

FOREIGN PATENT DOCUMENTS

| DE | 102018215918 A1 | 3/2020 |
| DE | 112018007566    | 1/2021 |
| EP |     2414184 A1  | 2/2012 |

OTHER PUBLICATIONS

European Patent Office, Written Opinion dated Jun. 6, 2022, in International Patent Application No. PCT/CZ2022/050019 filed Feb. 21, 2022.

* cited by examiner

ELECTRIC DRIVE MODULE FOR DRIVING AN AXLE

CROSS-REFERENCE TO RELATED APPLICATIONS

This application, filed under 35 USC 371, is a United States National Stage Application of International Application No. PCT/CZ2022/050019, filed Feb. 21, 2022, which claims priority to CZ Application No. PV 2021-78, filed on Feb. 21, 2021, the disclosures of which are incorporated herein by reference in there entireties.

TECHNICAL FIELD

The invention relates to an electric drive module for driving an axle, in particular for commercial trucks or independent suspension axles. The electric drive module is composed of a housing on which 1-2 electric motors are flange-mounted, driving via mechanical gears the main gear wheel, which is directly connected to a two-stage gearbox that drives the drive shafts of the moving wheels via axle differential.

BACKGROUND OF THE INVENTION

Drive modules for driving truck axles or independent suspension axles must have a high value of output torque to drive the shafts of carriers and moving wheels. Compared to passenger cars and light commercial vehicles, the output torque value of truck axles is typically 5-10 times higher. In order to achieve a high value of the output torque, the motor power must be efficiently transferred to the shafts of the carriers. This is usually associated with a number of mechanical connections, gears and similar components that are subject to high mechanical stress, so there is a principle that the less the better. It is therefore necessary to get as much power as possible to the output. Electric motors provide a more efficient option than internal combustion, or diesel, motors, but they need to be connected to a battery of sufficient capacity to be of real value in practice. This creates the need to save as much space as possible in the vehicle structure, which is then used for the placement of the battery. Trucks technically require at least two gears to operate efficiently at higher speeds. In order to achieve optimum power using only electric motors, it is often necessary to have two electric motors in the drive module. For the transfer of motor power to the drive shafts, these types of drive modules often have a so-called bevel gear, which is a source of high mechanical stress, particularly evident in trucks and heavy commercial vehicles.

The aim of the invention is to design the most compact possible electric drive module that will include the possibility of drive by one or two electric motors, a two-stage gearbox, and a mechanical axle differential. At the same time, this drive module provides high output torque values to the wheels attached to the output shaft flanges. The object of the present invention is also modularity and the possibility of placement in already existing axle spaces.

The electric drive module is described, for example, in document EP 2 414 184 B1. This solution includes only a one-stage gearbox and a two-stage gearbox can be added only modularly. The default arrangement therefore comprises only one motor, which is usually not enough for sufficient power in trucks, and the one-stage gearbox will not be sufficient for the optimum speed range. The modular inclusion of a second gearbox in itself represents a complex mechanical solution, as both parts need to be mechanically connected and thus involve a significant number of moving parts, which increases the complexity of the whole system and consequently its weight, the stress on individual parts, and the difficulty in subsequent repair.

Document U.S. Pat. No. 9,637,127 B1 describes a two-speed electric drive unit. The electric drive unit comprises an electric motor, a differential housing, a reducing gear set and two clutches. The housing of the differential also serves as the output member of the gearbox, as the planet gears of the planetary gearbox are mounted in the differential housing. The ratio of input and output of the gearbox is controlled by selectively engaging the clutches to change degrees of freedom of the electric drive unit.

Document DE 11/2018007566 T5 describes an electric bridge propulsion system and vehicle. The propulsion system is comprised of an electric motor connected to the planetary gearbox. The carrier of the planet gears of the planetary gearbox is connected to the case of the differential mechanism. The system described in this document is, however, allowing only a single-speed transmission.

Document CN 106314136 A describes an electric drive bridge system with a planetary transmission. The carrier of the planet gears is connected to the housing of the differential mechanism. The gear ratio of the planetary gearbox is reduced by a clutch that may selectively couple the satellite carrier with the ring gear.

SUMMARY OF THE INVENTION

The above mentioned shortcomings are to some extent eliminated by an electric drive module for driving an axle comprising a housing, at least one electric motor attached to the housing, a main gear wheel mechanically connected to the electric motor by mechanical gears, a gearbox, wherein the gearbox input member is driven by the main gear wheel, an axle differential located in an axle differential housing and driven by the gearbox output, drive shafts driven by the axle differential, wherein the axis of the shafts is parallel to the axis of the gearbox. The present drive module is preferably arranged such that at least a part of the differential housing is rigidly connected to the output member of the gearbox. The advantage of this solution lies in the reduction of the number of mechanical and moving elements in the electric drive module, which results in less wear of the individual parts, as well as space savings that can be used, for example, for the placement of a larger battery to drive the electric motor.

The differential comprises differential pinions adapted for rotation about the axis of the gearbox and planetary wheels attached to drive shafts and connected to the differential pinions by bevel gear. The gearbox is designed as a planetary gearbox and comprises a sun gear torsionally rigidly connected to the main gear wheel, planet gears, and a ring gear pivotally housed on the housing part on the side of the main gear wheel. The planet gear carrier is designed as an output member of the gearbox and is rigidly connected to a part of the differential housing or is a part thereof. The connection to the differential housing part is made in the region defined by the planet gear faces. This solution allows direct connection of the differential to the gearbox without the need for other mechanical elements, thus significantly reducing the weight and space requirements of the entire electric drive module, as well as reducing the number of mechanical moving parts and thus increasing the life of the module as a whole.

The part of the housing on the side of the main gear wheel is provided with a number of openings in which pins are housed. The planet gears are then pivotally housed on these pins. These openings are placed in the space between the cavity for the differential pinions, planetary wheel, and sun gear, and the outer diameter of the axle differential housing part.

The electric drive module preferably further comprises a shift ring, a shift sleeve slidably housed in the ring gear and slidably engaged in the gearing on the housing part, and a control fork by which the shift sleeve is moved. The shift sleeve can be housed in at least three positions corresponding to two gears and neutral. This preferable embodiment allows for a compact two-stage gearbox structure.

The drive shaft preferably passes through the main gear wheel and sun gear holes on the gear wheel side. Thus, one of the output shafts lies directly in the gearbox. The compact solution of the electric drive module also allows the use of two electric motors that are arranged such that their axes are parallel to the axis of the gearbox. This achieves a higher power of the electric drive module.

Preferably, at least a part of the differential housing is bearing-housed pivotally on a hub part of the main gear wheel. The way it is housed thus enables smooth rotational movement of the differential housing part and thus the differential as a whole.

In a further preferred embodiment, the electric drive module further comprises an electromagnetic sensor mounted in the housing and a sensing ring rigidly connected to the differential housing part. This preferred embodiment enables the measurement of the output speed.

The electric drive module preferably further comprises a parking brake system. This system comprises a parking brake shaft, a pinion located on the first side of the parking brake shaft, and a brake disc located on the opposite side of the shaft. A braking effect is exerted on the brake disc by a braking element, preferably a brake caliper, or its rotational movement is fixed. The parking brake system is located such that the rotational movement of the main gear wheel is transmitted to the pinion. This arrangement allows the braking of the main gear wheel and hence the entire electric drive module, wherein it is compact, comprises only a few mechanical elements, and is therefore less subject to wear and mechanical stress.

The parking brake system further comprises at least one parking brake countershaft provided with a first gear and a second gear. The countershaft is placed such that the first gear is connected to the main gear wheel by its gearing and the second gear is connected to the pinion by its gearing. This arrangement allows for a more efficient transmission of the braking effect due to the gear ratio between the pinion and the main gear wheel. Another preferred embodiment of the parking brake system comprises one additional countershaft, which multiplies the braking effect even further. Further improvement of the braking effect is achieved by the use of two brake calipers placed at opposite ends of the circumference of the brake disc.

To achieve effective compactness of the electric drive module as a whole, the parking brake system is placed such that the brake disc and brake caliper are placed in the space defined by the position of the differential and the output flange of the shaft on the fork side.

DESCRIPTION OF THE DRAWINGS

A summary of the invention is further clarified using exemplary embodiments thereof, which are described with reference to the accompanying drawings, where.

EXEMPLARY EMBODIMENTS OF THE INVENTION

Figure 1:
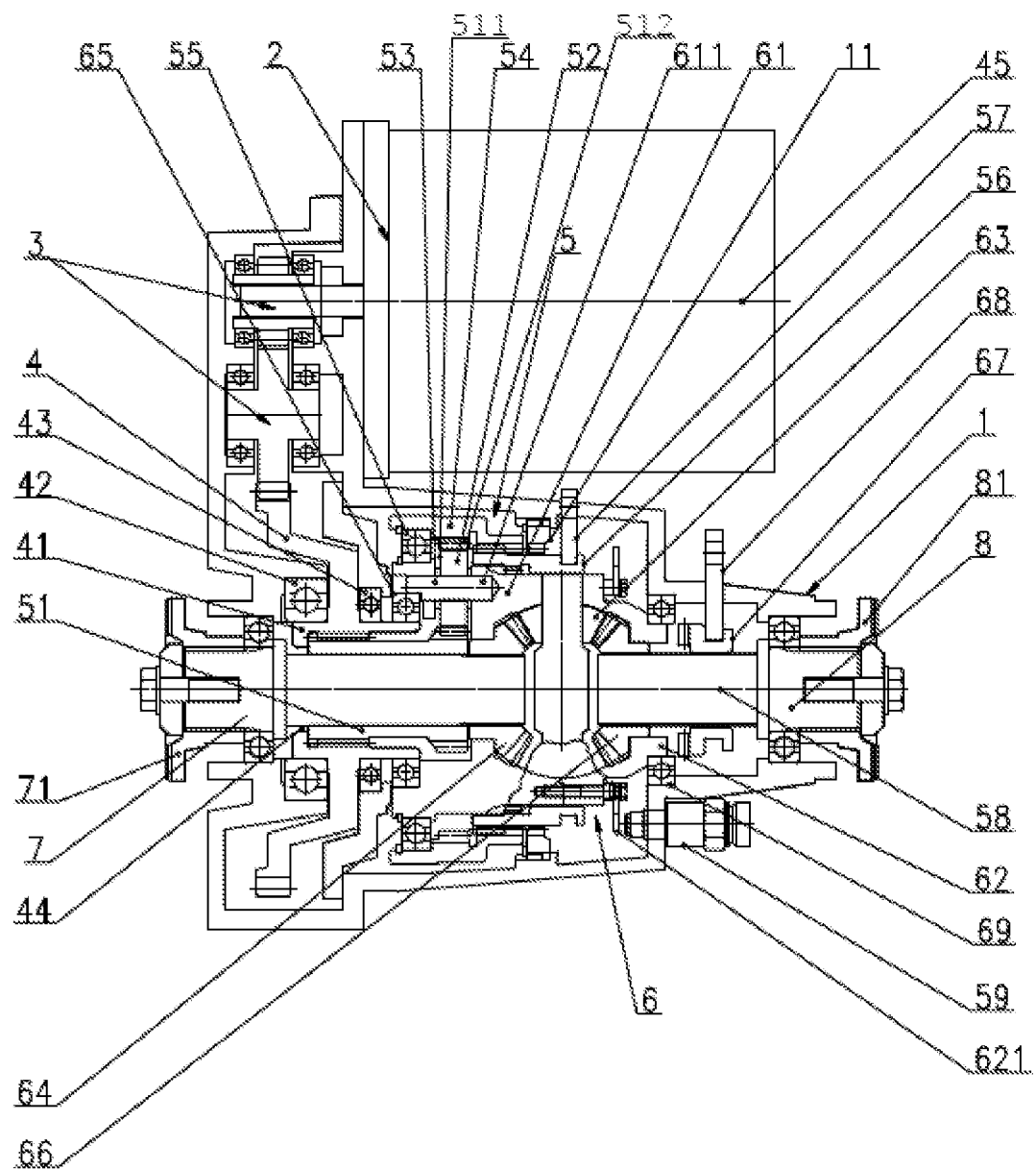
FIG. 1 shows a section of the electric drive module with one electric motor.
Figure 2:
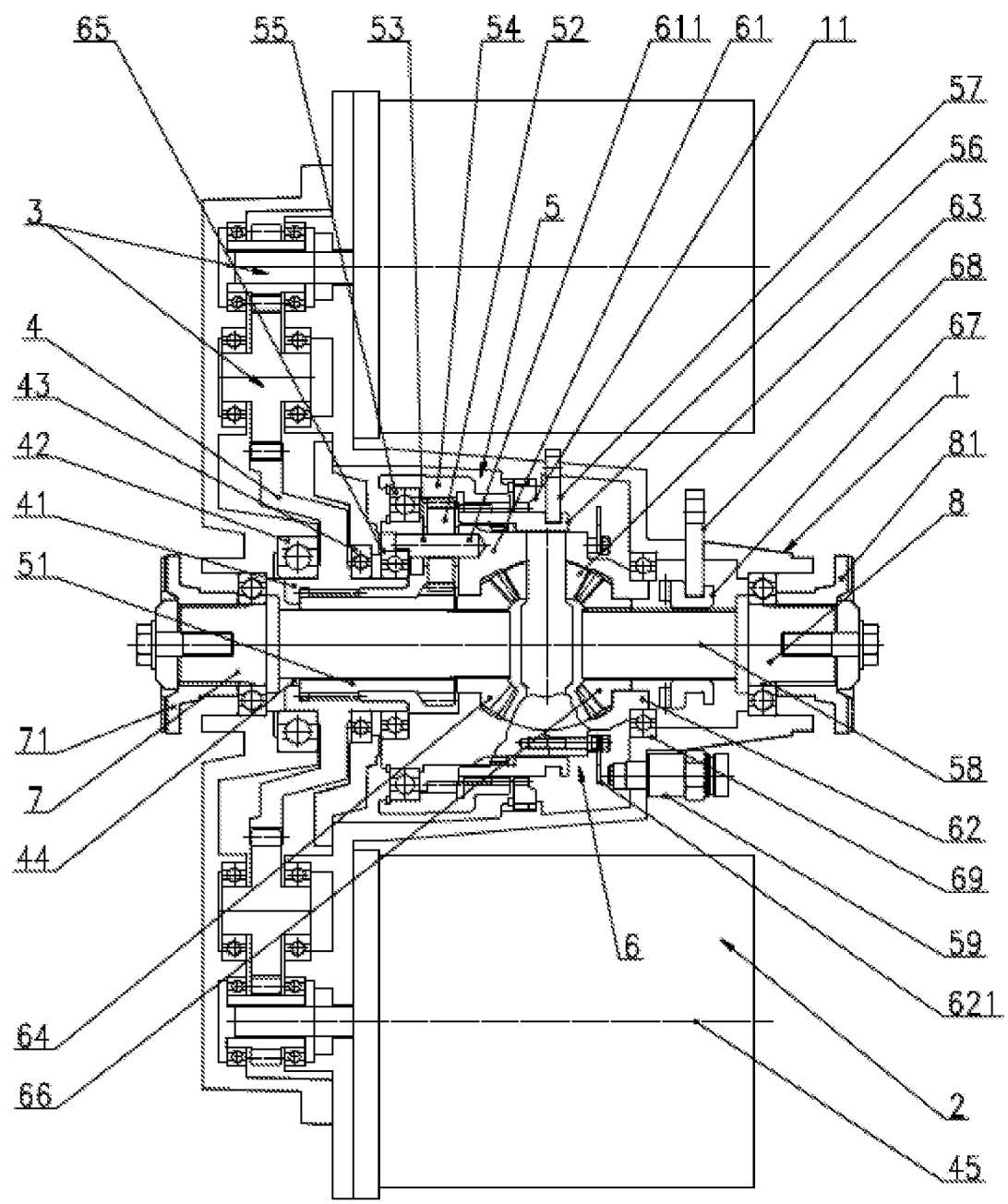
FIG. 2 shows a section of the electric drive module with two electric motors.
Figure 3:
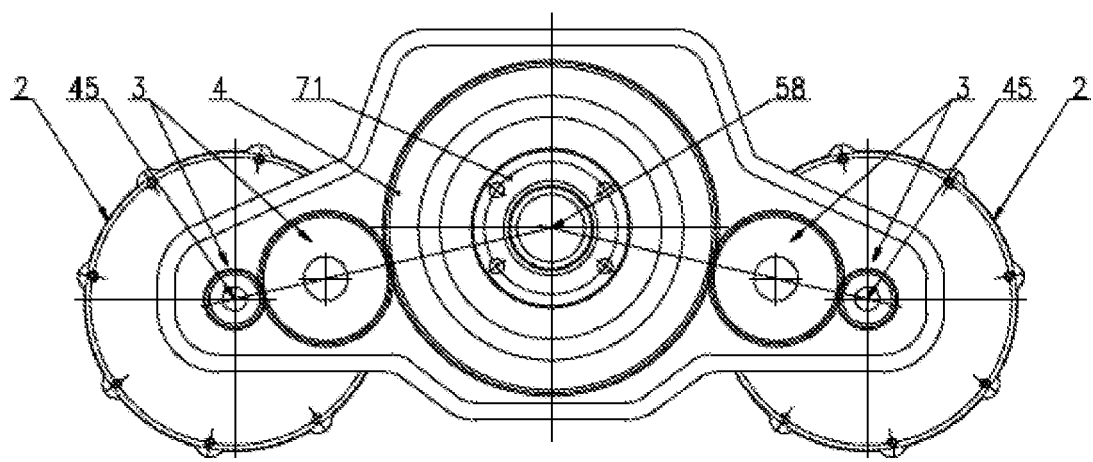
FIG. 3 shows a front view of the electric drive module with two electric motors.
Figure 4A:
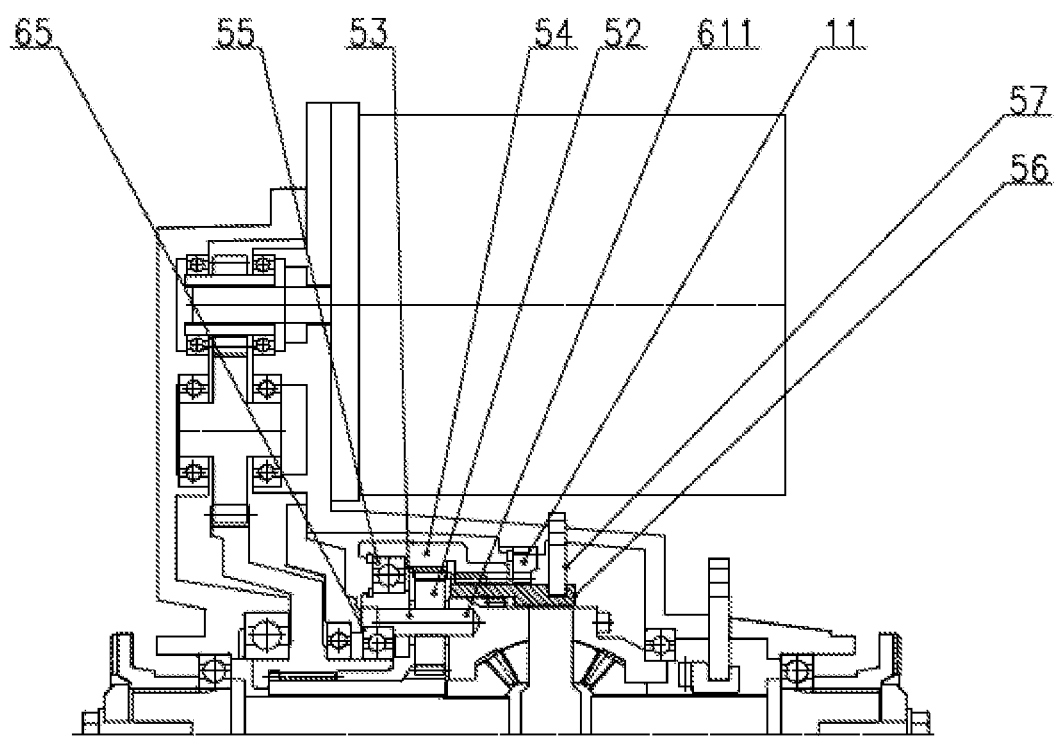
FIG. 4a shows a rectangular section of the electric drive module in the first gear.
Figure 4B:
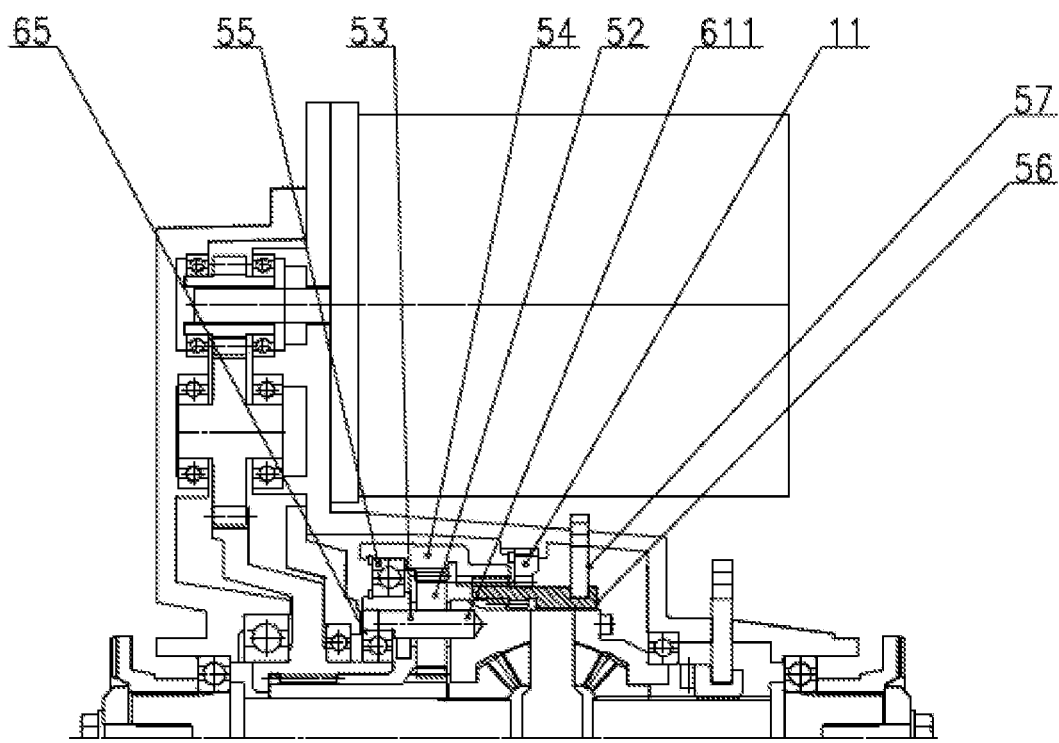
FIG. 4b shows a rectangular section of the electric drive module in neutral gear.
Figure 4C:
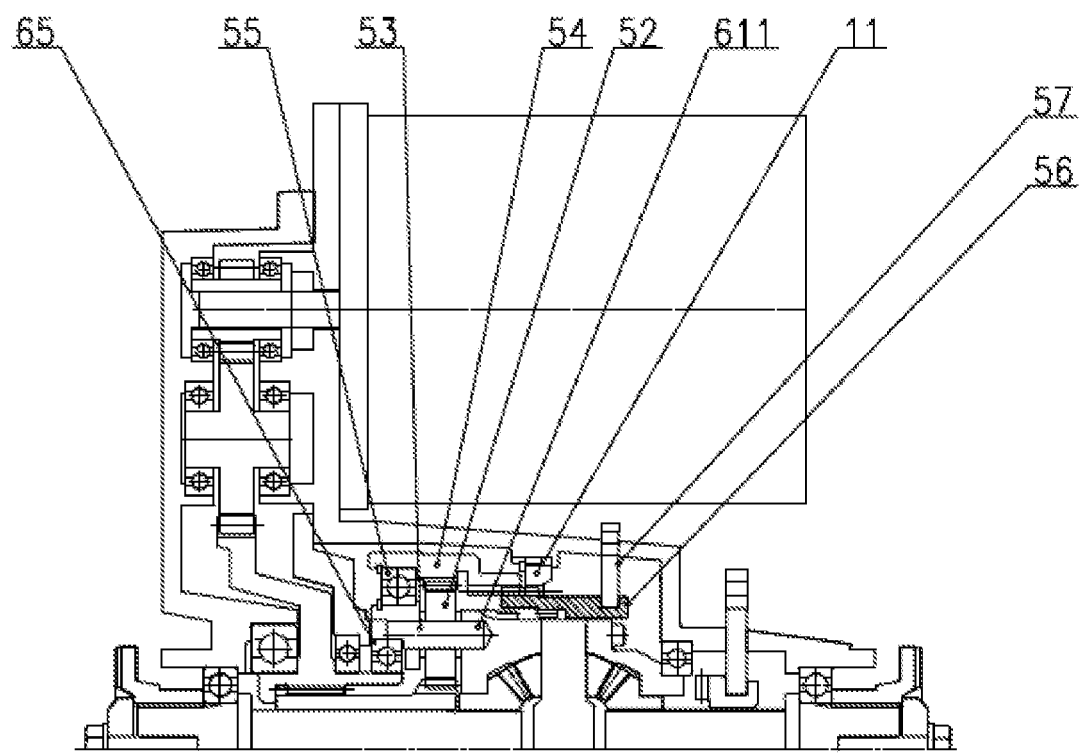
FIG. 4c shows a rectangular section of the electric drive module in the second gear.

The invention will be further clarified using exemplary embodiments with reference to the respective drawings, which, however, have no limiting effect from the point of view of the scope of protection.

In the exemplary embodiment shown in FIG. 1-5, the electric drive module comprises a housing 1 in which at least one electric motor 2 is attached, further comprising a gearbox 5, an axle differential 6, and rigidly attached shift ring 11.

The electric motor 2 is attached in the housing 2 by means of screws, flanges, or other fixing mechanism and then connected by means of mechanical gears 3 to the main gear wheel 4, to which the output rotational movement of the electric motor 2 is transmitted by the mechanical gears 3. The mechanical gears 3 are a set of gearwheels, shafts, chains, or wheels and belts and serve to transmit the output rotation of the electric motor 2 to other mechanisms of the electric drive module. The main gear wheel 4 is connected to the gearbox 5. The main gearwheel 4 therefore serves as the input member of the gearbox 5. The smooth rotational movement of the main gear wheel 4 is provided by the way it is pivotally housed by means of the first bearing 42 and the second bearing 43. The main gear wheel 4 is further provided with a hub 41 and a main wheel hole 44 located in the center of the main gear wheel 4. The invention is not limited to the use of only one electric motor 2, for example, multiple electric motors 2 may be used, wherein the electric motors 2 are arranged such that their axes 45 are parallel or perpendicular and the overall structure of the housing 1, the electric motors 2, and the gearbox 5 is symmetrical. In the case of a perpendicular arrangement of the axes 45 of the electric motors, these axes 45 can be in different planes. All electric motors 2 are then used to drive the rotational movement of the main gearwheel 4. For example, the electric motors 2 are arranged such that their axes 45 of rotation are parallel to the axis 58 of the gearbox. This exemplary embodiment is the preferred variant in terms of drive module symmetry and parallelism of all axes of rotation. However, it is also possible to have an arrangement where their axes are perpendicular to the axis 58 of the gearbox.

The gearbox 5 typically comprises an input member with angular velocity corresponding to the input angular velocity of an element of the gearbox 5. This angular velocity is then increased, decreased, or kept constant by means of the individual gears of the gearbox 5 and then transmitted to the output member of the gearbox 5. The angular velocities of the input and output members of the gearbox 5 may therefore differ. In an exemplary embodiment, the gearbox 5 is implemented as a two-stage planetary gearbox, however this choice does not represent any limitation in terms of the scope of protection. The gearbox 5 comprises a sun gear 51, at least three planet gears 52 attached on a planet gear carrier 510, for example four of them, and a ring gear 54. The sun gear 51 is fitted with the planet gears 2, which by their gearing fit into the gearing of the ring gear 54. The rotational movement of the sun gear 51 is made possible by the connection to the main gear wheel 4, to which the sun gear 51 is torsionally rigidly connected in its hole 44, their angular velocities are therefore the same. In planetary gearboxes, the sun gear 51 serves as the input member of the gearbox 5, and the planet gear carrier 510 serves as the output member of the gearbox 5. Since the rotation of the sun gear 51 corresponds to the rotation of the main gear wheel 4, the main gear wheel 4 can be regarded as the input member of the gearbox 5. The sun gear 51, the planet gears 2, and the ring gear 54 can rotate about the axis 58 of the gearbox. Each of the planet gears 52 then has its own axis of rotation passing through its center. Thus, the planet gears 52 may perform a dual rotational movement, one about the axis 58 of the gearbox, the other one about an axis proper to each planet gear 52. The gearbox 5 further comprises a shift sleeve 56 slidably housed in the ring gear 54 for changing the gear of the gearbox 5, and a shift fork 57 adapted to change the position of the shift sleeve 56.

The axle differential 6 is housed in the axle differential housing. The axle differential 6 housing may be a single piece, but is exemplarily composed of two or more connected parts 61, 62. In the case where the differential 6 housing is a single piece, the housing parts 61, 62 may designate certain regions on the differential 6 housing without the need to physically divide it into two separable parts. In an exemplary embodiment, the differential 6 housing is divided into two connected parts, namely a housing part 61 on the main gear wheel side and a housing part 62 on the fork side. The axle differential 6 is used to drive the travelling wheels to which it is connected and transmits movement to them by means of the drive shaft 7 on the main gear wheel side and the carriers 71 attached thereto and the drive shaft 8 on the fork side and the carriers 81 attached thereto. The central axes of the first and second shafts 7, 8 are identical or parallel to the axis 58 of the gearbox. For example, the drive shaft 7 on the main gearwheel side passes through the hole of the central gear 51 and the main gear wheel 4, thus in this arrangement the shafts 7, 8 lie on the axis 58 of the gearbox. The axle differential 6 is housed in the axle differential housing and comprises differential pinions 63, differential lock sleeve 67 and control fork 68. The differential pinions 63 are connected by gearing to the first side gear 64 attached on the first shaft 7 and to the second side gear 66 attached on the second shaft 8. The differential pinions 63 rotate about the axis 58 of the gearbox or an axis parallel thereto and with this rotational movement rotate the first and second planetary gears 64, 66 and hence the shafts 7, 8. The differential pinions 63 can further rotate about an axis passing through their center. The differential lock sleeve 67 is slidably housed on the drive shaft 8 on the fork side. During its translational movement, the differential lock sleeve 67 engages the gearing on the housing part 62 on the fork side. This movement of the differential lock sleeve 67 is controlled electronically by the differential control fork 68. The number of degrees of freedom of the differential 6 is controlled by the differential lock 68, where in a first position of the differential lock 68 the differential pinions 63 are allowed to rotate both about their central axis, generally perpendicular to the axis 58 of the gearbox, and about the axis 58 of the gearbox. In this position, the shafts 7, 8 can therefore rotate at different speeds. In the second position of the differential lock sleeve 67, the differential pinions 63 are fixed and can only perform rotation about the axis 58 of the gearbox and the shafts 7, 8 therefore rotate at the same speed.

At least the housing part 61 on the main gear wheel side is pivotally housed by the first differential bearing 65 on the main gear wheel hub part 41, and its rotational movement is thus allowed. In the case where the differential housing consists of a single piece, it is pivotally housed by the first differential bearing 65 on the main gear wheel hub part 41. Thus, at least a part of the housing may perform rotational movement about an axis parallel or identical to the axis 58 of the gearbox. In an exemplary embodiment, the rotation of the entire housing as a whole is enabled by the rigid connection of the housing parts 61, 62. However, the rotation of the housing is independent of the rotation of the main gear wheel 4. The housing 61 part on the main gear wheel side is further provided with an outer gearing and a number of openings 611 located in the space defined by the differential pinions 63, the first side gear 64, the sun gear 51, and the outer circumference of the housing part 61 on the main gearwheel side. The openings 611 correspond in their arrangement and number to the arrangement and number of the gearbox planet gears 52. The planet gear pins 53, on which the planet gears 52 are pivotally attached, are then rigidly housed in these openings 611. At least the housing part 61 on the main gear wheel side is pivotally housed in the housing 1 on the main gear wheel hub part 41 via the first differential bearing 65, and thus, due to its direct connection to the planet gears 52, serves as their carrier 510 and thus as the output member of the gearbox 5. Further, the ring gear 54 is pivotally housed on the housing part 61 on the main gearwheel side by means of the ring gear bearing 55, the housing part 61 on the main gear wheel side is therefore the closest element of the differential 6 with respect to the main gear wheel 4. This pivotal housing allows independent rotational movement of the ring gear 54 and part 51 of the differential housing on the main gear wheel side. The housing part 62 on the fork side is pivotally housed by the second differential bearing 69. Thus, this housing part 62 can perform rotational movement also when these parts 61, 62 are separated. In an exemplary embodiment of the invention, however, these parts 61, 62 are connected and thus perform the rotational movement together.

In an exemplary embodiment of the invention, two gears and neutral can be used in the gearbox 5. The shift sleeve 56 can thus be in three positions, where in the first position of the shift sleeve 56 shown in FIG. 4a, the first gear is engaged, in the second position of the shift sleeve 56 shown in FIG. 4b, the neutral is engaged, and in the third position of the shift sleeve 56 shown in FIG. 4c, the second gear is engaged. The change of position of the shift sleeve 56 is controlled electronically by the shift fork 57. When changing the position of the shift sleeve 56, there is a sliding engagement with the outer gearing on the housing part 61 on the side of the main gear wheel and the shift ring 11. In a slow gear, the sun gear 51 is driven by the main gear wheel 4 and the ring gear 54 is braked. The planet gears 52, to which the rotation of the sun gear 51 is transmitted, are connected to the sun gear 51 by the gearing. However, the ring gear 54 is fixed and the planet gears 52 are thus forced to orbit around the sun gear 51 while rotating about their own axis. The rotational movement of the planet gears 52 about the axis 58 of the gearbox is transmitted to the planet gear carrier 510, i.e., the output member. The output rotation of the planet gears 52 about the gearbox axis 58 is transmitted to at least the housing part 61, which itself serves as the planet gear carrier 510 and thus the output member, by means of the planet gear pins 53 placed in the housing openings 611. Thus, at least the differential housing part 61 rotates about the axis 58 of the gearbox. The differential pinions 63 placed in the differential housing 61, 62 begin to rotate about the axis 58 of the gearbox, they transmit the rotational movement by means of the bevel gear to the first and second side gears 64, 66 and thus begin to rotate the drive shafts 7 and 8. The slow gear, or first gear, thus slows the input rotational movement in a ratio determined by the ratios of the sun gear 51, planet gears 52, and ring gear 54. For example, the ratio of the rotation speed of the input and output of the gearbox 5 is 1:3.4, however, in terms of the scope of protection, this value is not limiting, but optional according to the application of the invention. In the fast gear, the ring gear 54 is rigidly pivotally connected by the shift sleeve 56 to at least the housing part 61. Thus, the rotation of the housing part 61 is associated with the rotation of the ring gear 54. This housing part 61, which also serves as the output member and planet gear carrier 510, rotates together with the ring gear 54 and the planet gears 52 about the axis 58 of the gearbox. Due to the direct connection of the ring gear 54 to the planet gear carrier 510, the rotational movement of the ring gear 54 is the output of the gearbox 5 with an output angular velocity ratio of 1:1. The differential 6 housing begins to rotate, the differential pinions 63 begin to rotate about the axis 58 of the gearbox, they transmit the rotational movement by means of the bevel gear to the first and second side gears 64, 66 and thus begin to rotate the drive shafts 7 and 8.

Figure 6:
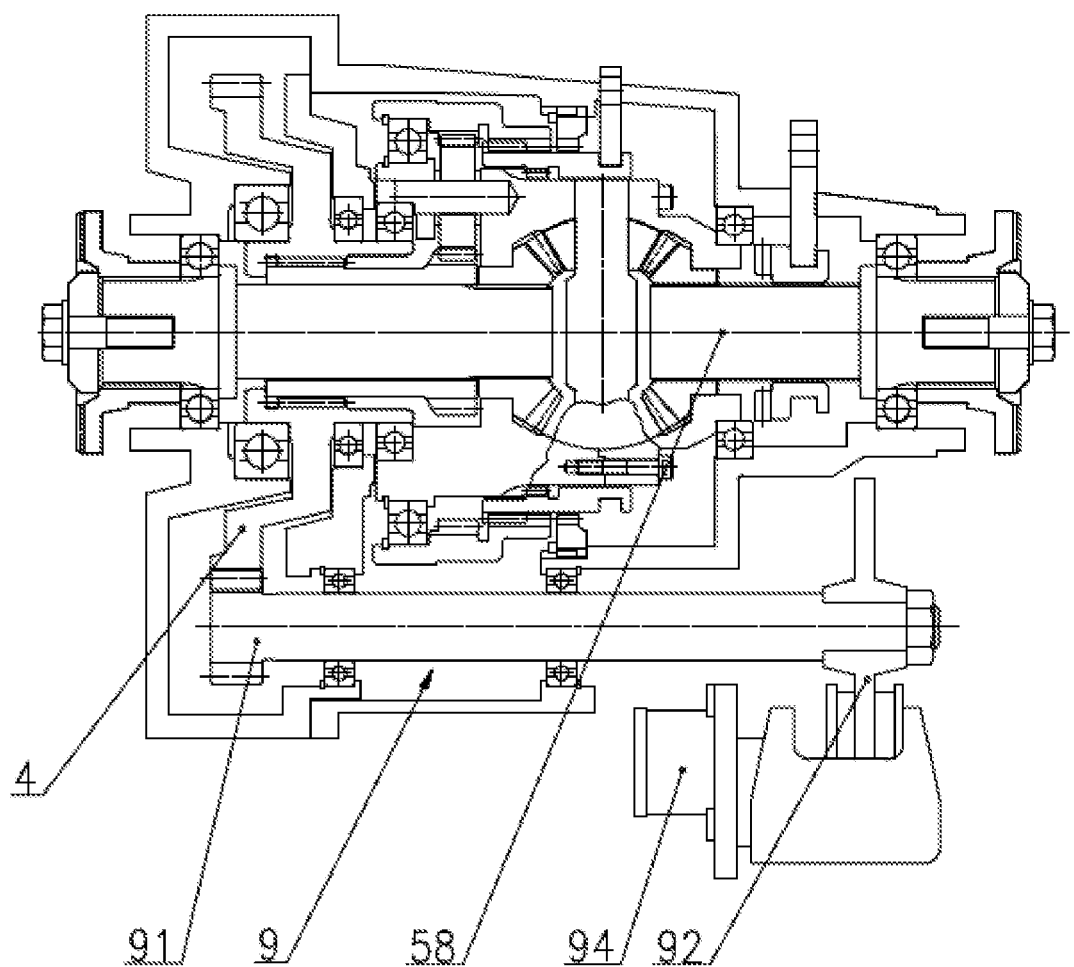
FIG. 6 shows a section of the electric drive module with the parking brake system.
Figure 8:
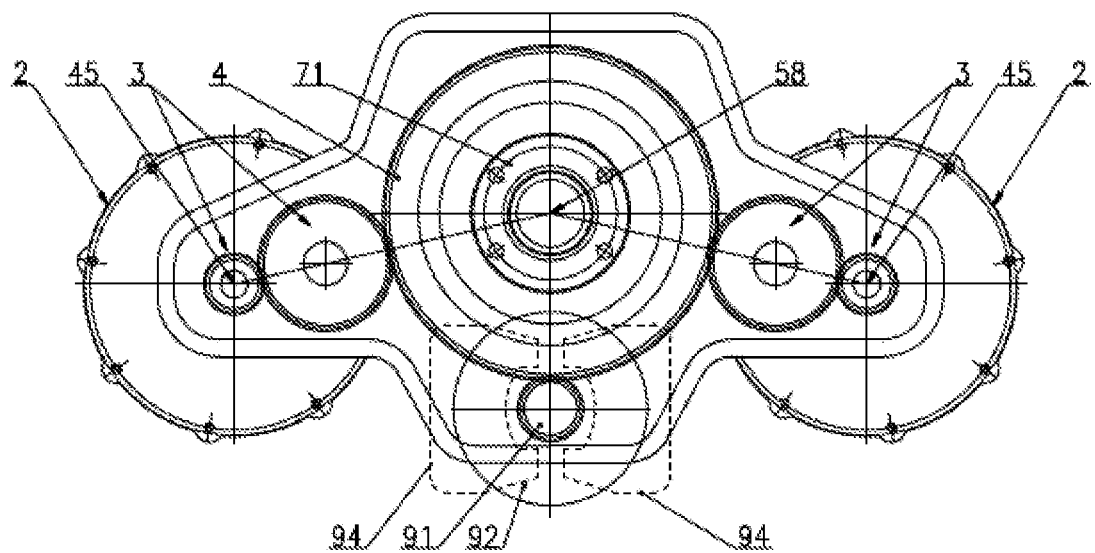
FIG. 8 shows a front view of the electric drive module with the parking brake system with two parking brake calipers.

In another exemplary embodiment shown in FIG. 6, the electric drive module comprises a parking brake system 9. The electric motor 2 is connected by mechanical gears 3 to the main gear wheel 4, to which the output rotational movement of the electric motor 2 is transmitted by the mechanical gears 3. The main gear wheel 4 is directly connected to gearbox 5. The main gear wheel 4 therefore serves as the input member of the gearbox 5. The smooth rotational movement of the main gear wheel 4 is provided by the first bearing 42 and the second bearing 43. The main gear wheel 4 is further provided with a hub 41 and a main gear wheel hole 44 located in the center of the main gear wheel 4. The invention is not limited to the use of only one electric motor 2, for example, multiple electric motors 2 may be used, wherein the electric motors 2 are arranged such that their axes 45 are parallel or perpendicular and the overall structure of the housing 1, the electric motors 2, and the gearbox 5 is symmetrical. In the case of a perpendicular arrangement of the axes 45 of the electric motors, these axes 45 can be in different planes. All electric motors 2 are then used to drive the rotational movement of the main gear wheel 4. For example, the electric motors 2 are arranged such that their axes of rotation are parallel to the axis 58 of the gearbox. However, it is also possible to have an arrangement where their axes are perpendicular to the axis 58 of the gearbox. The electric drive module further comprises a parking brake system 9 attached to the housing 1 in the space defined by the electric motors 2. The parking brake system 9 comprises at least a parking brake shaft 93, a pinion 91 rigidly connected to the parking brake shaft 93 on one side thereof, a parking brake disc 92 rigidly connected to the parking brake shaft 93 on a side opposite to the pinion 91, and at least one braking element 94 securing the rotation of the brake disc 92 by pressure. For example, a brake caliper 94 is used as the braking element 94, but the invention is not limited to the use of this braking element, e.g., a drum brake mechanism may be selected as another exemplary embodiment. For example, two brake calipers 94 placed opposite each other may be used, as shown in FIG. 8, or in such a way that they grip the brake disc 92 at opposite ends of its circumference. The brake calipers 94 are placed on the side of the drive shaft 8 on the fork side, i.e., at the point where the size of the differential housing 6 is already decreasing. The axis of the parking brake shaft 93 is approximately parallel to the axis 58 of the gearbox. The parking brake system 9 is placed such that the rotational movement of the main gear wheel 4 is transmitted to the pinion 91 rigidly attached on the parking brake shaft 93 and it rotates the parking brake shaft 93 and, therefore, the parking brake disc 92. The parking brake system 9 has braking effect when the electric drive module is either idling or switched off. The braking effect is achieved by pressing the brake disc 92 with the brake caliper 94. This prevents the rotation of the parking brake shaft 93 and the pinion 91. Due to the connection between the pinion 91 and the main gear wheel 4, the rotational movement of the main gearwheel 4 is prevented, which ultimately prevents the rotation of the carriers 71, 72 and therefore the rotation of the wheels through the gearbox 5 and the differential 6.

Figure 7:
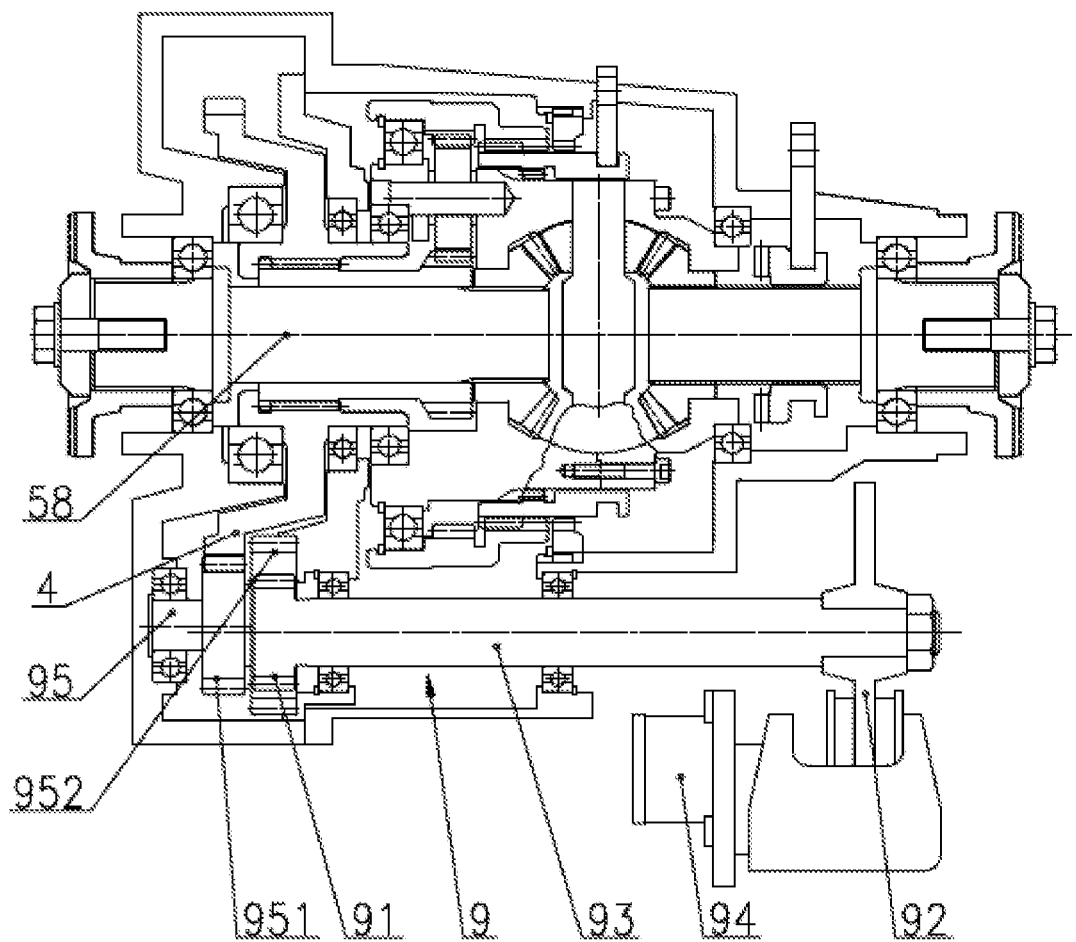
FIG. 7 shows a section of the electric drive module with the parking brake system with two countershafts.
Figure 9:
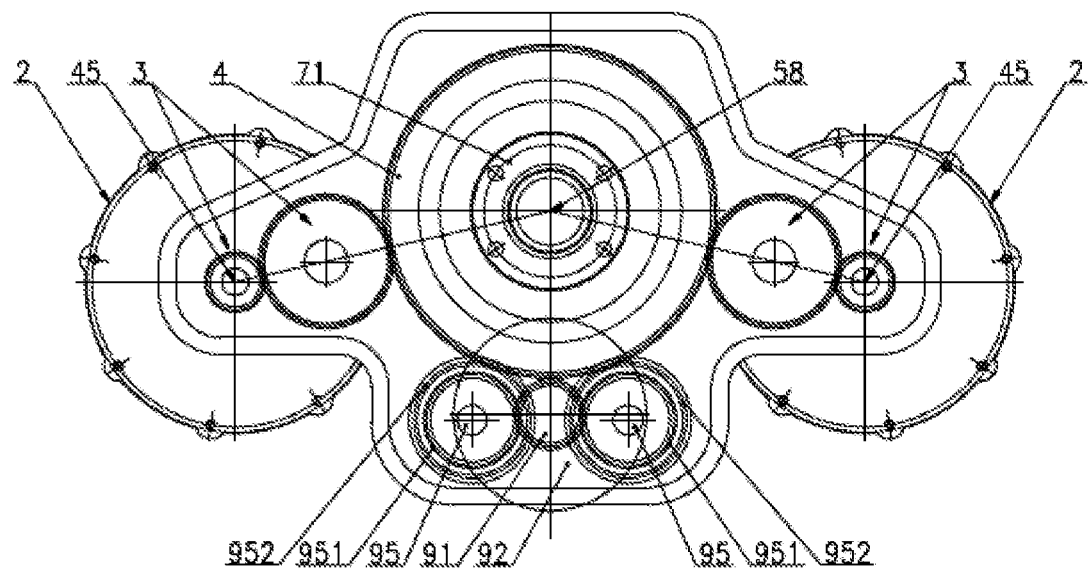
FIG. 9 shows a front view of the electric drive module with the parking brake system with two parking brake countershafts.

In another exemplary embodiment shown in FIGS. 7 and 9, the parking brake system 9 further comprises at least one parking brake countershaft 95 provided with a first parking brake gear 951 and a second parking brake gear 952. The countershaft 95 is placed such that its first parking brake gear 951 is connected by its gearing to the gearing of the main gear wheel 4 and its second parking brake gear 952 is connected by its gearing to the pinion 91. In the case where two countershafts 95 are used, the second countershaft 95 is placed such that the above arrangement conditions are met. In the whole structure of the electric drive module, the parking brake system 9 is placed such that the axes of the disc and spindle are as close as possible to the axis 58 of the gearbox. Then, in order to achieve a higher compactness of the entire electric drive module, the parking brake system 9 is exemplarily placed such that the brake disc 92 and the brake caliper 94 lie in the region defined by the position of the differential 6 and the output flange 81 of the shaft on the fork side, as can be seen in FIGS. 6 and 7.

Figure 5:
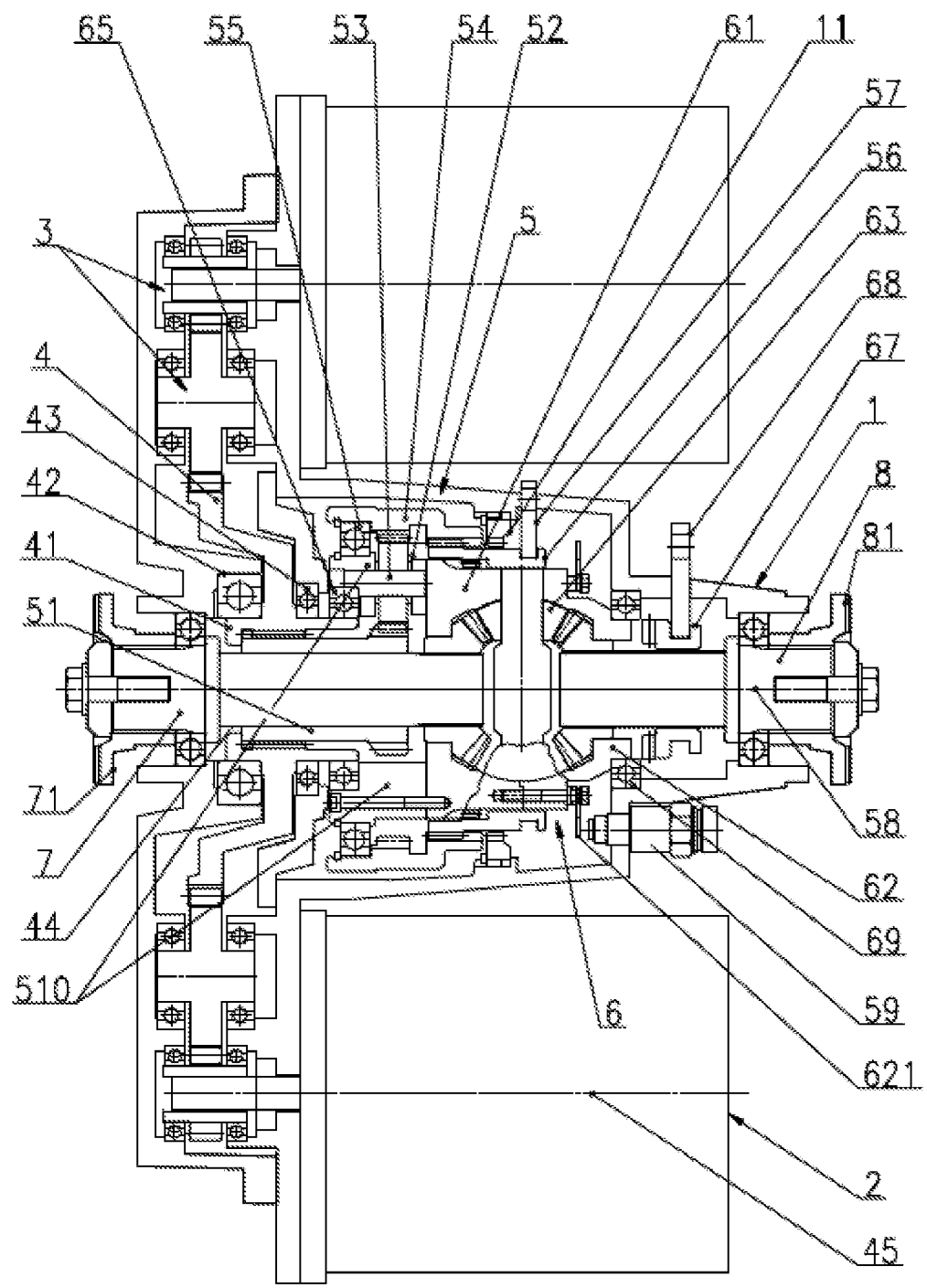
FIG. 5 shows a rectangular section of the electric drive module.

In another exemplary embodiment shown in FIG. 5, the electric drive module is further equipped with a speed sensor 59 and a sensing ring 621. The speed sensor 59 is designed as an electromagnetic sensor and is mounted in the housing 1 of the electric drive module. The sensing ring 621 is attached on the differential housing, which is designed as an output member and thus rotates about the axis 58 of the gearbox. Similarly, the sensing ring 621 rotates about this axis and periodically comes into proximity of the speed sensor 59. The sensing ring 621 induces in the speed sensor 59 an electrical voltage with a periodic waveform, where the period of the voltage waveform corresponds to the period of rotation of the sensing ring 621 about the axis 58 of the gearbox.

In an exemplary embodiment, the axle width, or the distance between the axle carriers 71, is 700 mm.

LIST OF REFERENCE SIGNS

1—housing
11—shift ring
2—electric motor
3—mechanical gears
4—main gear wheel
41—main gear wheel hub part
42—main gear wheel first bearing
43—main gear wheel second bearing
44—main gear wheel hole
45—axis of the electric motor
5—gearbox
51—sun gear
52—planet gear
53—planet gear pin
54—ring gear
55—ring gear bearing
56—shift sleeve
57—shift fork
58—axis of the gearbox
59—speed sensor
510—planet gear carrier
511—planet gear face
512—planet gear face
6—axle differential
61—housing part on the main gear wheel side
611—housing openings
62—housing part on the fork side
621—sensing ring
63—differential pinion
64—first side gear
65—first differential bearing
66—second side gear
67—differential lock sleeve
68—differential lock fork
69—second differential bearing?
7—drive shaft on the main gear wheel side
71—output carrier
8—drive shaft on the fork side
81—output carrier
9—parking brake
91—pinion
92—parking brake disc
93—parking brake shaft
94—brake caliper
95—parking brake countershaft
951—first parking brake gear wheel
952—second parking brake gear wheel

The invention claimed is:

1. An electric drive module for driving an axle comprising a housing, at least one electric motor attached to the housing, a main gear wheel mechanically connected to the at least one electric motor via mechanical gears, a gearbox designed as a planetary gearbox, wherein it comprises a sun gear torisonally rigidly connected to the main gear wheel, planet gears, and a ring gear, wherein an input member of the gearbox is driven by the main gear wheel, an axle differential located in an axle differential housing and driven by a gearbox output, drive shafts driven by the axle differential, wherein an axis of the drive shafts is parallel to an axis of the gearbox, wherein at least part of the differential housing is rigidly connected to the output member of the gearbox, wherein the ring gear is pivotally housed on the at least part of the differential housing part on a main gear wheel side by a ring gear bearing.

2. The electric drive module for driving an axle of claim 1, wherein the differential comprises differential pinions adapted for rotation about the axis of the gearbox and side gears attached on the drive shafts and connected by bevel gear to the differential pinions.

3. The electric drive module for driving an axle of claim 1, wherein a carrier of the planet gears is designed as the gearbox output member and is rigidly connected to the at least part of the differential housing part or is a part thereof, wherein the connection to the at least part of the differential housing part is made in an region defined by the planet gear faces.

4. The electric drive module for driving an axle of claim 3, wherein the at least part of the differential housing part on the main gear wheel side is provided with a number of openings in which pins are inserted, wherein the planet gears are pivotally housed on the pins.

5. The electric drive module for driving an axle of claim 4, wherein the openings are placed in a space between a cavity for differential pinions, side gears, and the sun gear and an outer circumference of the at least part of the differential housing part of the axle differential.

6. The electric drive module for driving an axle of claim 3 further comprising a rigidly attached shift ring, a shift sleeve slidably fitted in the ring gear via connecting spline and slidably engaging with the spline of the at least part of the differential housing part on the main gear wheel side, and a shift fork adapted to move the shift sleeve, wherein the shift sleeve has at least three positions, where a first position corresponds to a slow gear, a second position corresponds to a neutral, and a third position corresponds to a second gear, wherein in the slow gear, the ring gear is fixed by the shift sleeve, and in the second gear the ring gear is connected by the shift sleeve to the at least part of the differential housing part on the main gear wheel side.

7. The electric drive module for driving an axle of claim 1, wherein a drive shaft on the main gear wheel side passes through a hole of the main gear wheel and the sun gear.

8. The electric drive module for driving an axle of claim 1, wherein the electric drive module comprises two electric motors, wherein axes of the electric motors are parallel to the axis of the gearbox.

9. The electric drive module for driving an axle of claim 1, wherein the at least part of the differential housing part of the axle differential is supported by a bearing on a hub part of the main gear wheel.

10. The electric drive module for driving an axle of claim 1 further comprising an electromagnetic speed sensor mounted in the housing and a sensing ring rigidly connected to the at least part of the differential housing part on a fork side, wherein the speed sensor with a prescribed clearance is axially adjacent to the sensing ring.

11. The electric drive module for driving an axle of claim 1 further comprising a parking brake system, the parking brake system comprising a parking brake shaft, a pinion placed on a first side of the parking brake shaft, a brake disc placed on a side of the parking brake shaft opposite to the pinion, and a braking element adapted to exert a braking effect on the brake disc, wherein the parking brake system is placed such that a rotational movement of the main gear wheel is transmitted to the pinion.

12. The electric drive module for driving an axle of claim 11, wherein an axis of the parking brake shaft forms an angle of less than 5° with the axis of the gearbox.

13. The electric drive module for driving an axle of claim 11, wherein the parking brake system further comprises at least one parking brake countershaft provided with a first gear and a second gear and placed such that the first gear is connected by its gearing to the main gear wheel and the second gear is connected by its gearing to the pinion.

14. The electric drive module for driving an axle of claim 13 further comprising two countershafts arranged around the circumference of the main gear wheel.

15. The electric drive module for driving an axle of claim 11 further comprising two brake calipers placed at opposite ends of the circumference of the brake disc.

16. The electric drive module for driving an axle of claim 11, wherein the brake disc and a brake caliper are placed in a space defined by a position of the differential and an output flange of a drive shaft on a fork side.

* * * * *